United States Patent [19]

Rapisarda

[11] Patent Number: 4,864,887
[45] Date of Patent: Sep. 12, 1989

[54] DEVICE FOR INTERCONNECTING A BICYCLE PEDAL AND A CYCLING SHOE

[76] Inventor: Antonio Rapisarda, Via Fidia 2, 10141 Torino, Italy

[21] Appl. No.: 199,652

[22] Filed: May 27, 1988

[30] Foreign Application Priority Data

May 28, 1987 [IT] Italy .................. 53355/87[U]

[51] Int. Cl.$^4$ .............................................. G05G 1/14
[52] U.S. Cl. ..................... 74/534.6; 36/131; 74/594.4
[58] Field of Search ........... 74/594.6, 594.4, 560; 36/131, 132, 122; 280/613, 615, 59

[56] References Cited

U.S. PATENT DOCUMENTS

| 4,272,036 | 6/1981 | Efros ..................... 74/594.6 X |
| 4,488,453 | 12/1984 | Drugeon et al. ........... 74/594.6 |
| 4,686,867 | 8/1987 | Bernard et al. ........... 74/594.6 |
| 4,735,107 | 4/1988 | Winkie ................... 74/594.6 |
| 4,738,158 | 4/1988 | Christol ................. 74/594.6 |

FOREIGN PATENT DOCUMENTS

| 0146454 | 6/1985 | European Pat. Off. ........ 74/594.6 |
| 3149345 | 8/1983 | Fed. Rep. of Germany ..... 74/594.4 |
| 3638155 | 5/1987 | Fed. Rep. of Germany ..... 74/594.6 |

Primary Examiner—Richard E. Moore
Assistant Examiner—Vinh Luong
Attorney, Agent, or Firm—Sughrue, Mion, Zinn, Macpeak & Seas

[57] ABSTRACT

A device for interconnecting a bicycle pedal and a cycling shoe includes a block applied to the sole of the shoe and incorporating a spring bolt which is slidable lengthwise of the sole of the shoe in the plane of the block and is adapted to snap-engage in a slot formed in a fixed flange projecting upwardly from the rear end of the pedal. The bolt can be disengaged from the slot of the pedal by a lateral rotation of the shoe.

1 Claim, 1 Drawing Sheet

DEVICE FOR INTERCONNECTING A BICYCLE PEDAL AND A CYCLING SHOE

BACKGROUND OF THE INVENTION

The present invention relates to devices for interconnecting a bicycle pedal and a cycling shoe.

More particularly, the invention concerns a device of the type comprising a block applied to the sole of the shoe, retention means between the front end of the block and the pedal, and locking means between the rear end of the block and the pedal, including a spring catch and an engagement part which are snap-engageable as a result of the placing of the shoe on the pedal and disengageable by a lateral rotation of the shoe on the pedal relative to the retention means.

In a known device of the type specified above, described in European patent application No. EP-A-146,454, the spring catch is constituted by a retaining pawl pivotably mounted on a pin carried by the pedal and adapted to engage a coupling projection formed in the shoe.

SUMMARY OF THE INVENTION

This known device has the disadvantage of being relatively complicated and expensive, particularly with reference to the manufacture and assembly of the pedal.

The object of the present invention is to avoid the above problem and to produce a device of the type specified at the beginning which is simpler and cheaper to produce and does not require complicated constructional details of the pedal.

According to the invention, this object is achieved by means of a device of the aforementioned type for interconnecting a bicycle pedal and a cycling shoe, characterised in that the spring catch is constituted by a bolt incorporated in the block and slidable substantially in the plane of the block through the rear end thereof, and in that the engagement part is constituted by a slot formed in a fixed edge projecting from the rear end of the pedal.

In comparison with the known devices described previously, this solution has the advantage of involving a smaller number of components and enabling a simpler construction of the pedal. The sliding bolt conformation of the catch incorporated in the block ensures an equally simple and cheap construction, without involving an excessive increase in thickness in comparison with the blocks normally applied to cycling shoes.

The rear end of the plate and the edge of the pedal preferably have an arcuate configuration, which makes the disengagement of the device by a lateral rotation of the shoe easier and more convenient.

The bolt may conveniently be formed by a flat element with a rear edge which is chamfered at the bottom and at the sides in order further to facilitate the engagement and disengagement of the device.

BRIEF DESCRIPTION OF THE DRAWINGS

Further characteristics and advantages of the invention will become clear from the detailed description which follows with reference to the appended drawings, provided by way of non-limiting example, in which.

DETAILED DESCRIPTION OF THE INVENTION

Figure 1:
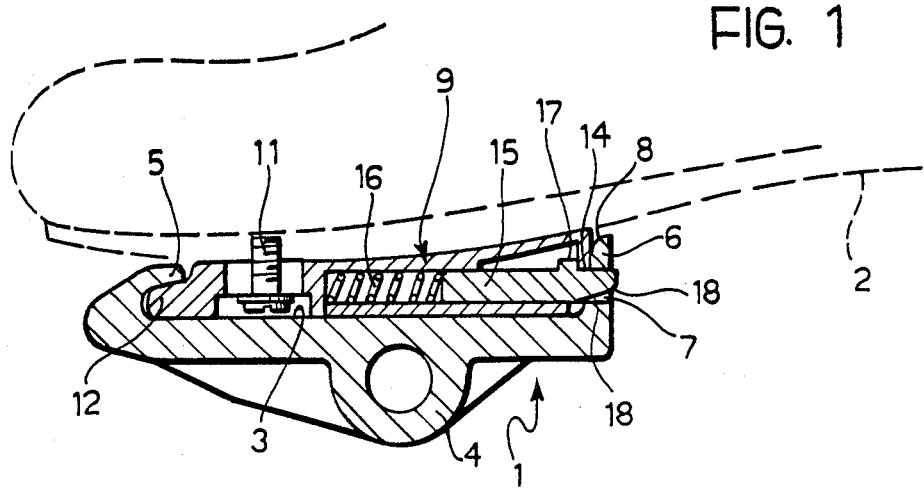
FIG. 1 is a partial cross-sectional view of a device according to the invention taken substantially along the line A—A in FIG. 3.
Figure 2:
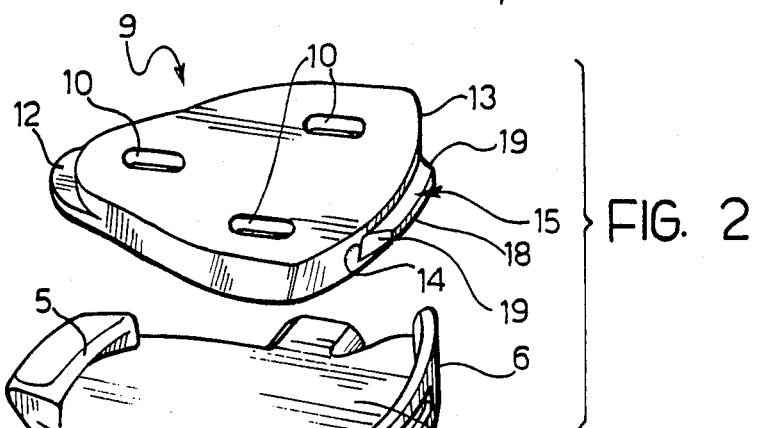
FIG. 2 is an exploded perspective view of the device.

With reference to the drawings, a bicycle pedal is generally indicated 1 and a cycling shoe connected to the pedal 1 by means of an interconnecting device according to the invention is indicated 2.

The pedal 1 is constituted by a metal body forming a bearing base 3 with a lower tubular transverse part 4 for the insertion of the shaft (not illustrated) for connecting the pedal to the pedal crank of the bicycle.

The platform 3 is delimited at the front by an undercut projection 5 and at the rear by a raised edge 6 having an arcuate shape with a radius of curvature situated substantially in correspondence with the region of the retaining projection 5. An elongate slot 7 is formed in the middle part of the edge 6. Moreover, the upper rim of the edge 6 has a chamfered surface on the side of the platform 3.

A block fixed permanently to the front region of the sole of the shoe 2 is indicated 9. The block 9, which may be of metal or of moulded plastics material, has a shape which generally corresponds to that of the platform 3 of the pedal 1 and is provided with three through-holes 10 serving for the engagement of screws 11 for fixing to the sole of the shoe (2).

Figure 3:
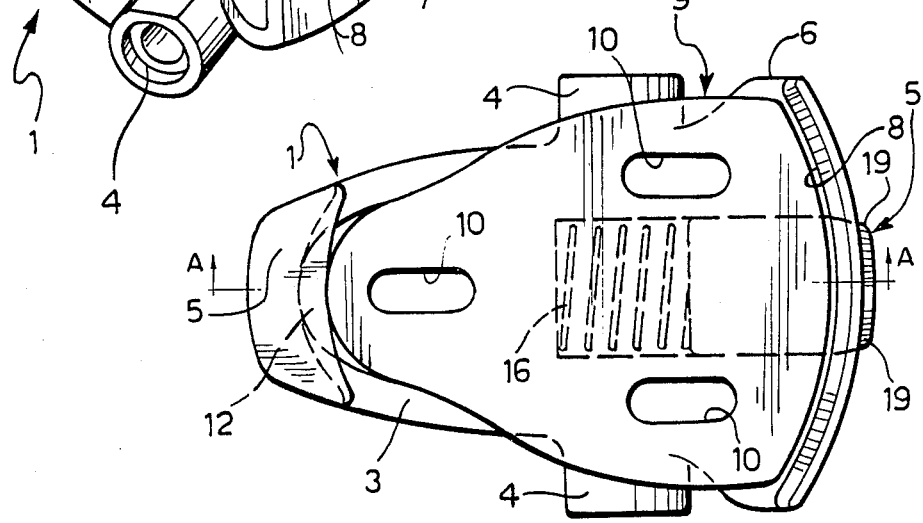
FIG. 3 is a plan view of the device from above.

The front edge of the block 9 is rounded and has a tab 12 of reduced height for insertion beneath the retaining projection 5 of the pedal 1, in the manner which can better be seen in FIG. 3.

The rear end of the block 9, indicated 13, has a curved shape corresponding to that of the edge 6 of the pedal 1, and is provided centrally with an aperture 14 through which a bolt 15 is slidable. The bolt 15 is constituted by a plate which is slidable within the block 9, substantially in the plane thereof, and is thrust outwardly by means of a helical compression spring 16. The bolt 15 is provided with a stop 17 for limiting its projection from the aperture 14 and its free end is chamfered at the bottom at 18 and laterally at 19.

It is possible to provide a system (not illustrated) for adjusting the load of the spring 16, constituted, for example, by a bearing for the spring situated at its end opposite the bolt 15 and movable by means of a rotary cam.

The width of the bolt 15 corresponds to that of the slot 7 in the wall 6 of the pedal 1. In order to avoid any play of the bolt 15 in the aperture 7 in the condition of use, the bolt 15 may be constituted, in the manner made clear below, by two halves side-by-side and a resilient intermediate member adapted to urge the two halves apart. It is preferable, however, that there is a small lateral clearance (for example, of the order of 5° to the right and to the left) between the bolt 15 and the ends of the slot 7 in the mutually engaged condition.

The operation of the device according to the invention is as follows.

In order to clamp the shoe 2 to the pedal 1 in the manner illustrated in FIG. 1, it is only necessary to place the plate 9 on the platform 3 and introduce the retaining tab 12 beneath the projection 5, keeping the heel of the shoe slightly raised. At this point, the free end of the bolt 15 is brought into contact with the top of the edge 6 by the lowering of the heel of the shoe. By virtue of the chamfered configuration of the lower edge 18 of the block 9 and the upper rim 8 of the wall 6, further lowering of the shoe relative to the pedal 1 causes the retraction of the bolt 15 against the action of the spring 16, enabling the bottom of the block 9 to be positioned so that it rests on the platform 3. When this position is reached, the rear end of the bolt 15 is situated in correspondence with the slot 7 of the edge 6 and therefore snap-engages therein under the action of the spring 16. The shoe 2 is thus clamped to the pedal 1, since any attempt to raise the shoe is prevented by the bolt 15.

In order to disengage the shoe 2 from the pedal 1, it suffices for the user to rotate his foot laterally by an angle of the order of 15° to 20°, normally outwardly of the bicycle, pivoting about the retaining tab 12 engaged beneath the projection 5. As a result of this rotation and by virtue of the lateral chamfers 19 of the bolt 15 and the arcuate conformation of the edge 6 and of the rear end 13 of the block 9, the bolt 15 re-enters the block 9 against the action of the spring 16 and is released from the slot 7. In this way, it is only necessary to raise the heel of the shoe 2 and extract the retaining tab 12 from the projection 5 to release the block 9 completely from the pedal 1.

I claim:

1. A bicycle pedal and shoe fastener combination for interconnecting a bicycle pedal and a cycling shoe having the shoe fastener secured to a sole thereof comprising:
   a block having means for securing said block to a sole of a cycling shoe;
   retention means between a front end of the block and the pedal; and
   locking means between a rear end of the block and a pedal, said locking means including a spring catch on said block and an engagement part on said pedal which are snap engagable as the result of pressing the block on the pedal and disengagable by a lateral rotation of the block on the pedal relative to said retention means;
   wherein said spring catch comprises a bolt mounted in a recess in said block and slidable substantially in the plane of the block through an aperture in the rear end of the block; and
   wherein said engagement part is comprised of an upstanding flange on said pedal having a slot therein for receiving said bolt, said bolt being comprised of a flat element having a rear end chamfered at a bottom and sides thereof.

* * * * *